(12) United States Patent
Mouri et al.

(10) Patent No.: US 8,979,387 B2
(45) Date of Patent: Mar. 17, 2015

(54) BICYCLE HUB ASSEMBLY

(75) Inventors: Seiji Mouri, Osaka (JP); Hiroshi Fujita, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/610,129

(22) Filed: Sep. 11, 2012

(65) Prior Publication Data

US 2014/0070602 A1    Mar. 13, 2014

(51) Int. Cl.
*F16C 13/00*    (2006.01)
*B60B 27/02*    (2006.01)

(52) U.S. Cl.
CPC ............ *B60B 27/023* (2013.01); *B60B 27/026* (2013.01); *B60B 2900/113* (2013.01); *B60B 2900/115* (2013.01)
USPC ........................................................ 384/545

(58) Field of Classification Search
USPC ......... 384/513, 537, 540, 543, 545, 589, 906; 74/594.1, 594.2
See application file for complete search history.

(56) References Cited

U.S. PATENT DOCUMENTS

| | | | | |
|---|---|---|---|---|
| 958,548 | A | * | 5/1910 | Sapp .............................. 384/545 |
| 1,375,149 | A | * | 4/1921 | Haggerty ...................... 384/545 |
| 3,157,442 | A | * | 11/1964 | Gaubatz ........................ 384/540 |
| 6,976,791 | B2 | | 12/2005 | Kanehisa et al. |
| 7,186,030 | B2 | * | 3/2007 | Schlanger ..................... 384/545 |

* cited by examiner

*Primary Examiner* — James Pilkington
(74) *Attorney, Agent, or Firm* — Global IP Counselors (57) ABSTRACT

A bicycle hub assembly includes a hub axle, a hub shell, a bearing unit, a retaining member, a lock member and an intermediate member. The bearing unit has a first ring that is coupled to the hub axle, a second ring that is coupled to the hub shell, and a plurality of rollers that is disposed between the first and second rings. The retaining member is coupled to the first ring and retains an axial position of the first ring with respect to the hub axle. The retaining member includes a first attachment face. The lock member is fixedly coupled to the hub axle. The lock member includes a second attachment face that faces the first attachment face of the retaining member. The intermediate member is disposed between the first attachment face of the retaining member and the second attachment face of the lock member.

18 Claims, 5 Drawing Sheets

BICYCLE HUB ASSEMBLY

BACKGROUND

1. Field of the Invention

This invention generally relates to a bicycle hub assembly. More specifically, the present invention relates to a bicycle hub assembly with a retaining member for a bearing unit.

2. Background Information

Conventionally, bicycle hub assemblies have a hub shaft or axle, a hub shell or body and a pair of bearing units. The hub axle is non-rotatably mounted to a frame of the bicycle (for example, to a front-fork). The hub body is coaxially coupled to the hub axle so that the hub body is disposed radially outwardly with respect to the hub axle. The bearing units are configured and arranged to support the hub body so that the hub body can freely rotate around the hub axle. The bearing units are angular-type bearings. Each of the bearing units is provided with an outer ring or cup, an inner ring or cone, and a plurality of rolling components (balls). The outer ring is disposed along an inner peripheral surface of the hub body and includes a ball receiving surface. The inner ring is screwed into the hub axle and includes a ball pushing surface. The rolling components are disposed between the outer ring and the inner ring at predetermined intervals in a circumferential direction of the hub. The inner ring is axially locked by a retaining member that is coupled to the hub axle adjacent to the inner ring.

When assembling such a hub assembly, the hub body first is installed on the hub axle, and the outer rings (if formed separately from the hub body) are installed on the hub body. Next, the rolling components and their associated retainers are installed in the outer rings, and grease is applied. Once the rolling components have been installed, the inner rings are screwed onto the hub axle to rotatably support the hub body relative to the hub axle. At this time, an axial position of the hub body is adjusted by adjusting at least one of axial positions of the inner rings. This step is called bearing adjustment. Then, the inner rings are locked with the retaining members.

SUMMARY

With this conventional hub assembly described above, the bearing adjustment needs to be performed for smooth rotation of the hub body relative to the hub axle. Furthermore, the retaining members need to be securely positioned relative to the hub axle for maintaining the axial positions of the inner rings after the bearing adjustment.

One object of the present disclosure is to provide a bicycle hub assembly with which a retaining member for a bearing unit is securely positioned relative to a hub axle.

In view of the state of the known technology, a bicycle hub assembly includes a hub axle, a hub shell, a bearing unit, a retaining member, a lock member and an intermediate member. The hub shell is rotatably supported to the hub axle. The bearing unit rotatably supports the hub shell relative to the hub axle. The bearing unit has a first ring that is coupled to the hub axle, a second ring that is coupled to the hub shell, and a plurality of rollers that is disposed between the first and second rings. The retaining member is coupled to the first ring of the bearing unit and retains an axial position of the first ring of the bearing unit with respect to the hub axle. The retaining member includes a first attachment face. The lock member is fixedly coupled to the hub axle. The lock member includes a second attachment face that faces the first attachment face of the retaining member. The intermediate member is disposed between the first attachment face of the retaining member and the second attachment face of the lock member.

Other objects, features, aspects and advantages of the present disclosure will become apparent to those skilled in the art from the following detailed description, which, taken in conjunction with the annexed drawings, discloses a preferred embodiment of the bicycle hub assembly.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
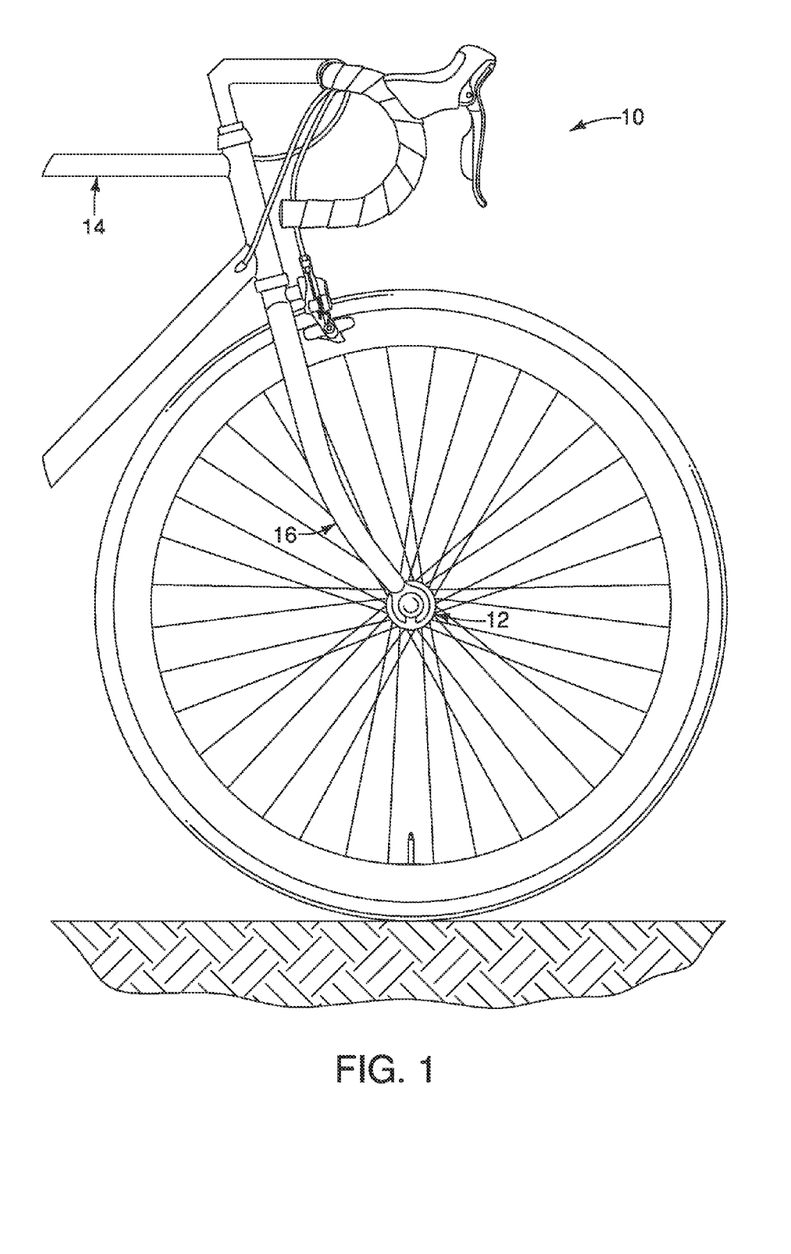
FIG. 1 is a partial side elevational view of a bicycle that is equipped with a bicycle hub assembly in accordance with one embodiment.

Referring initially to FIG. 1, a bicycle 10 is illustrated that is equipped with a front hub 12 (e.g., a bicycle hub assembly) and a rear hub (not shown) in accordance with one embodiment. The front hub 12 is attached to a front fork 16 (e.g., a bicycle fork) of the bicycle frame 14 in a conventional manner for rotatably supporting a front wheel relative to the bicycle frame 14. Since the parts of the bicycle 10 are well known in the art, the parts of the bicycle 10 will not be discussed or illustrated in detail herein, except for the parts that relate to the bicycle hub assembly. In other words, only the parts related to the front hub 12 will be discussed and illustrated in detail herein. Of course, it will be apparent from this disclosure that the arrangement of the front hub 12 can also be applied to the rear hub for rotatably supporting a rear wheel (not shown). Moreover, various conventional bicycle parts such as brakes, additional sprockets, derailleurs, etc., which may or may not be illustrated herein, can also be used in conjunction with the present disclosure.

Figure 2:
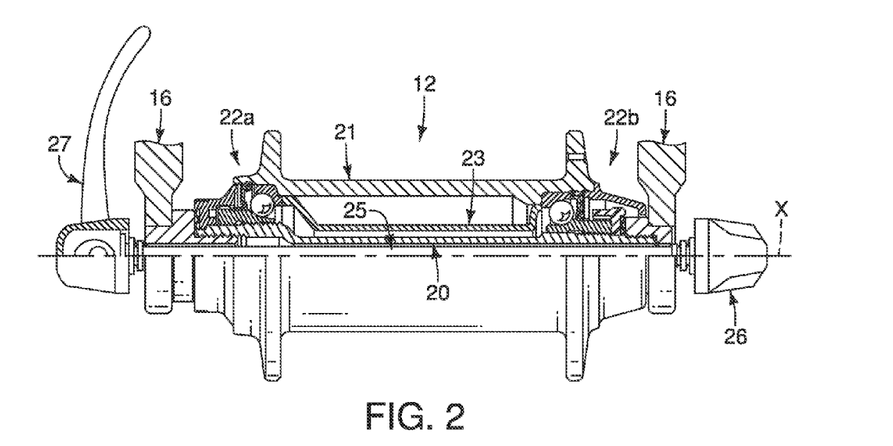
FIG. 2 is a partial cross sectional view of the bicycle hub assembly illustrated in FIG. 1, illustrating the bicycle hub assembly mounted to a front fork of the bicycle with a quick release rod.
Figure 3:
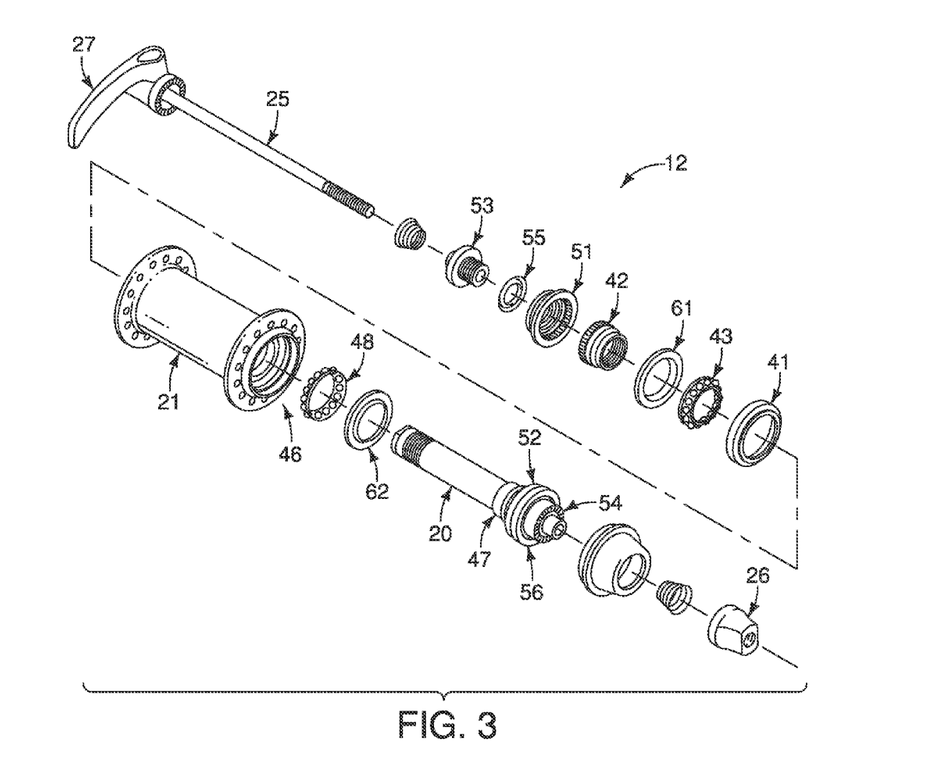
FIG. 3 is an exploded perspective view of the bicycle hub assembly illustrated in FIG. 2.

As further shown in FIGS. 2 and 3, the front hub 12 basically includes a hub shaft or axle 20, a hub body or shell 21, a pair of left and right bearings 22a and 22b (e.g., bearing units) and an inner tubular structure 23 for sealing grease applied to the left and right bearings 22a and 22b. The hub axle 20 is configured to be freely attachable to or detachable from the front fork 16 (e.g., a bicycle fork) of the bicycle frame 14 (see FIG. 1) in a conventional manner. The hub body 21 is coaxially disposed radially outwardly with respect to the hub axle 20. The hub body 21 is rotatably supported to the hub axle 20. The left bearing 22a and the right bearing 22b are disposed between the hub axle 20 and the hub body 21 at axial end portions of the hub body 21 as seen in FIG. 2. The left and right bearings 22a and 22b rotatably support the hub body 21 relative to the hub axle 20. The hub body 21 is freely rotatable on the hub axle 20 in both rotational directions about the hub axle 20. In the illustrated embodiment, the hub axle 20 of the front hub 12 is arranged as a quick release lever type hub axle. Thus, as shown in FIGS. 2 and 3, the hub axle 20 of the front hub 12 has a hollow axle body that is configured to receive a quick hub rod 25 with an adjusting nut 26 at one end and a cam lever 27 at the other end.

Figure 4:
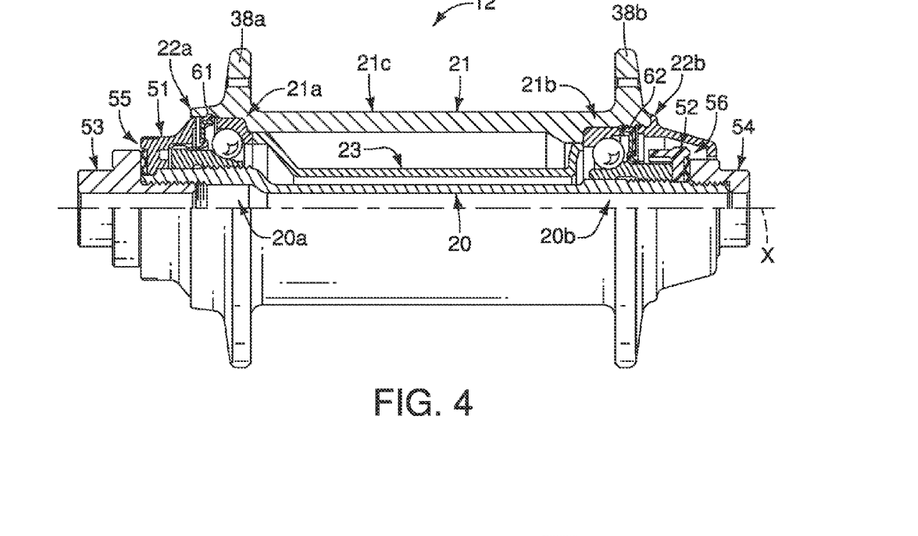
FIG. 4 is a partial cross sectional view of the bicycle hub assembly illustrated in FIG. 1.

As shown in FIG. 4, the hub axle 20 has left and right end structures 20a and 20b on the left and right ends of the hub axle 20, respectively.

Figure 5:
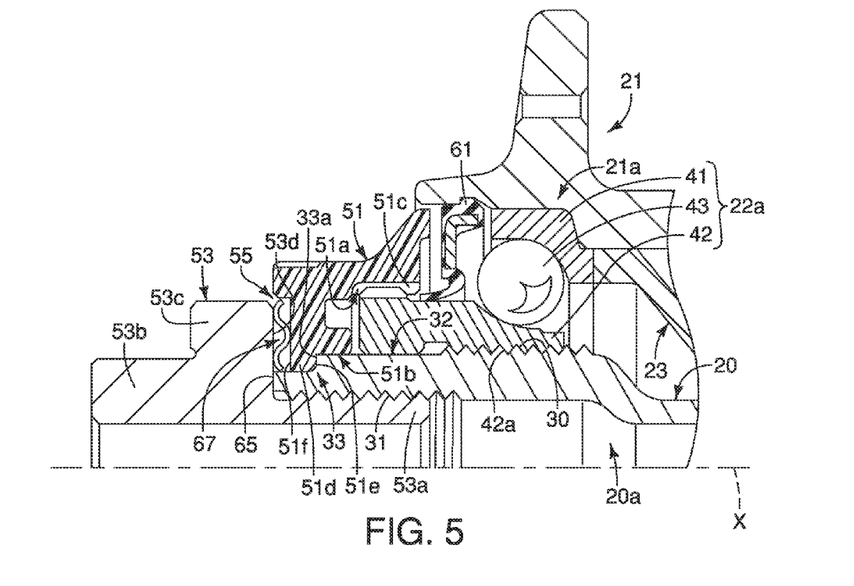
FIG. 5 is an enlarged partial cross sectional view of the bicycle hub assembly illustrated in FIG. 4, illustrating a left end portion of the bicycle hub assembly.
Figure 6:
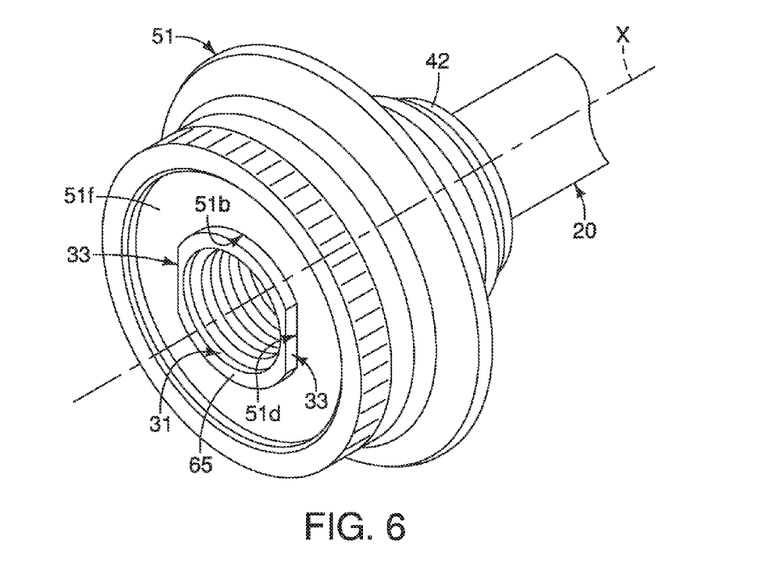
FIG. 6 is an enlarged partial perspective view of the bicycle hub assembly illustrated in FIG. 4, illustrating the left end portion of the bicycle hub assembly.

As best shown in FIG. 5, the left end structure 20a has a left handed male or external screw section 30 (e.g., a threaded section) on the outer peripheral surface of the left end, and a left handed female or internal screw section 31 on the inner peripheral surface of the left end. The male screw section 30 is arranged to extend from a portion located slightly inside of the portion to which the left bearing 22a is mounted toward the outward axial direction. The female screw section 31 is arranged to extend from a portion axially overlapping with the portion to which the male screw section 30 is provided toward the outward axial direction. The left end structure 20a further has a non-threaded section 32 on the outer peripheral surface of the left end and a pair of mutually parallel chamfered sections 33 (e.g., recessed parts) (only one chamfered section 33 is shown in FIG. 5) along the female screw section 31 of the left end. The non-threaded section 32 is arranged to extend from a portion located slightly outside of the portion to which the male screw section 30 is provided toward the outward axial direction. The non-threaded section 32 basically has a cylindrical peripheral surface (e.g., an outer peripheral face). The chamfered sections 33 are arranged outside of the portion to which the non-threaded section 32 is provided toward the outward axial direction. As best shown in FIG. 6, the chamfered sections 33 have flat surfaces that extend parallel to a center axis X of the hub axle 20, respectively. The non-threaded section 32 and the chamfered sections 33 form a retaining member attachment section.

Figure 7:
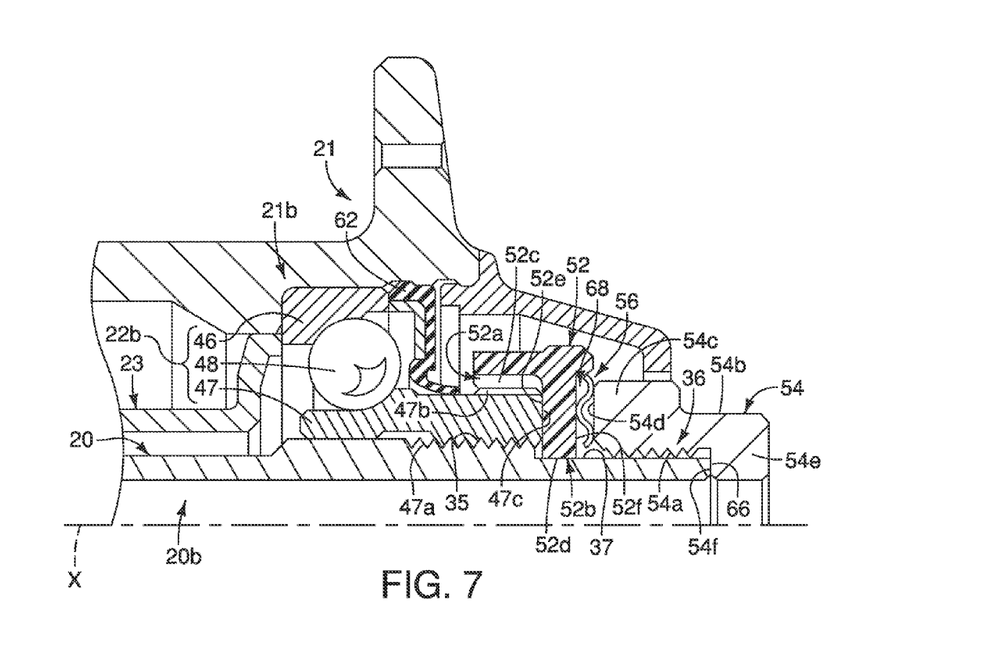
FIG. 7 is an enlarged partial cross sectional view of the bicycle hub assembly illustrated in FIG. 4, illustrating a right end portion of the bicycle hub assembly.
Figure 8:
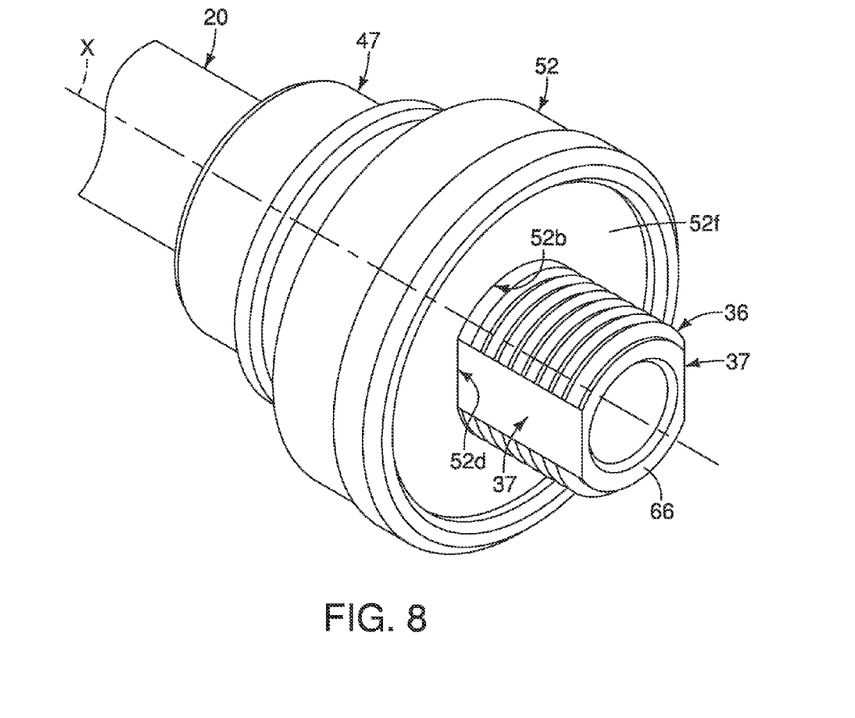
FIG. 8 is an enlarged partial perspective view of the bicycle hub assembly illustrated in FIG. 4, illustrating the right end portion of the bicycle hub assembly.

As best shown in FIG. 7, the right end structure 20b has a right handed male or external screw section 35 (e.g., a threaded section) on the outer peripheral surface of the right end, and a right handed male or external screw section 36 on the outer peripheral surface of the right end. The male screw section 35 is arranged to extend from a portion located slightly inside of the portion to which the right bearing 22b is mounted toward the outward axial direction. The male screw section 36 is arranged to extend from a portion located slightly outside of the portion to which the male screw section 35 is provided toward the outward axial direction. The right end structure 20b further has a pair of mutually parallel chamfered sections 37 (e.g., recessed parts) (only one chamfered section 37 is shown in FIG. 7) along the male screw section 36 of the right end. The chamfered sections 37 are arranged outside of the portion to which the male screw section 35 is provided toward the outward axial direction. As best shown in FIG. 8, the chamfered sections 37 have flat surfaces that extend parallel to the center axis X of the hub axle 20, respectively. In other words, the chamfered sections 37 are formed on an outer peripheral face of the male screw section 36.

As shown in FIG. 4, the hub body 21 of the front hub 12 has a generally tubular shape and is, for example, made of aluminum alloy. The hub body 21 includes a pair of hub flanges 38a and 38b on the outer peripheral surface for attaching spokes thereto in conventional manner. The hub body 21 further includes an internal bore with a pair of bearing mounting sections 21a and 21b at each axial end portion for receiving the left bearing 22a and the right bearing 22b, respectively, and a center tube section 21c. In particular, the left and right bearings 22a and 22b are fittedly mounted to the bearing mounting sections 21a and 21b, respectively.

As best shown in FIGS. 3 and 5, the left bearing 22a basically includes a left outer ring or cup 41 (e.g., a second ring), a left inner ring or cone 42 (e.g., a first ring) and a plurality of generally spherical rolling components 43 (e.g., rollers) (only one rolling component 43 is shown in FIG. 5). The left outer ring 41 of the left bearing 22a is pressed into and coupled to the bearing mounting section 21a of the hub body 21, which is formed on the inner perimeter in the axial end portion of the hub body 21. The left inner ring 42 of the left bearing 22a is threadedly coupled to the male screw section 30 of the hub axle 20. The rolling components 43 are disposed between the left outer ring 41 and the left inner ring 42. Similarly, as best shown in FIGS. 3 and 7, the right bearing 22b basically includes a right outer ring 46 (e.g., a second ring), a right inner ring 47 (e.g., a first ring) and a plurality of generally spherical rolling components 48 (e.g., rollers) (only one rolling component 48 is shown in FIG. 7). The right outer ring 46 of the right bearing 22b is pressed into and coupled to the bearing mounting section 21b of the hub body 21, which is formed on the inner perimeter in the axial end portion of the hub body 21. The right inner ring 47 of the right bearing 22b is threadedly coupled to the male screw section 35 of the hub axle 20. The rolling components 48 are disposed between the right outer ring 46 and the right inner ring 47.

As seen in FIG. 5, the left outer ring 41 includes a ball receiving surface (e.g., an outer bearing surface) that faces in a generally axial outward direction towards the first or left axle end of the hub axle 20. The left inner ring 42 includes a ball pushing surface (e.g., an inner bearing surface) that faces in a generally axial inward direction towards the second or right axle end of the hub axle 20. Likewise, as seen in FIG. 7, the right outer ring 46 includes a ball receiving surface (e.g., an outer bearing surface) that faces in a generally axial outward direction towards the second or right axle end of the hub axle 20. The right inner ring 47 includes a ball pushing surface (e.g., an inner bearing surface) that faces in a generally axial inward direction towards the first or left axle end of the hub axle 20. Therefore, the left bearing 22a and the right bearing 22b are arranged as angular ball bearings, in which the load capacity relative to the thrust direction is greater. The left axial end of the inner tubular structure 23 contacts with an inner edge of the left outer ring 41 as shown in FIG. 5, while the right axial end of the inner tubular structure 23 contacts with an inner edge of the right outer ring 46 as shown in FIG. 7. The left and right inner rings 42 and 47 have internal bores with female or internal threads 42a and 47a that are screwed into the male screw sections 30 and 35, respectively, which are formed on the outer peripheral surface of the hub axle 20. The axial positions of the left and right inner rings 42 and 47 relative to the hub axle 20 are adjusted by rotating the left and right inner rings 42 and 47 relative to the hub axle 20.

As shown in FIGS. 3 and 4, the front hub 12 further includes a pair of left and right retaining members 51 and 52, a pair of left and right lock members 53 and 54, and a pair of left and right intermediate members 55 and 56. Furthermore, the front hub 12 further includes a pair of left and right sealing rings 61 and 62. As best shown in FIGS. 5 and 7, the sealing rings 61 and 62 are disposed in the outer axial end portions of the left bearing 22a and the right bearing 22b, respectively. The sealing rings 61 and 62 seal the end gaps between the hub body 21 and the left and right inner rings 42 and 47, respectively.

Referring now to FIGS. 5 to 8, the left and right retaining members 51 and 52, the left and right lock members 53 and 54, and the left and right intermediate members 55 and 56 will be further described in detail.

As best shown in FIG. 5, the left retaining member 51 is non-rotatably and slidably engaged with the left inner ring 42 of the left, bearing 22a. The axial position of the left inner ring 42 relative to the hub axle 20 is locked or retained by the left retaining member 51. The left lock member 53 is threadedly coupled to the female screw section 31 of the hub axle 20. The left intermediate member 55 is disposed between the left retaining member 51 and the left lock member 53 such that the left intermediate member 55 contacts with the left retaining member 51 and the left lock member 51.

Specifically, the left retaining member 51 is made of non-metallic material. In particular, the left retaining member 51 is made of a resin, such as a carbon fiber reinforced resin. Of course, the left retaining member 51 can be made of any other suitable materials such as a hard plastic resin or a metallic material. The left retaining member 51 is a one-piece, unitary member. The left retaining member 51 has first and second inner peripheral surfaces 51a and 51b. The second inner peripheral surface 51b is smaller in diameter than the first inner peripheral surface 51a. The second inner peripheral surface 51b is configured such that the non-threaded section 32 and the chamfered sections 33 of the hub axle 20 extend through a bore defined by the second inner peripheral surface 51b of the left retaining member 51. The left retaining member 51 also has a plurality of internal splines 51c on the first inner peripheral surface 51a, and a pair of engaging parts 51d on the second inner peripheral surface 51b (only one of the engaging parts 51d is shown in FIG. 5). The internal splines 51c of the left retaining member 51 mesh with a plurality of external splines 42b of the left inner ring 42 of the left bearing 22a, thereby non-rotatably and slidably coupling the left retaining member 51 with the left inner ring 42 of the left bearing 22a. As best shown in FIG. 6, the engaging parts 51d non-rotatably engage with the chamfered sections 33 of the hub axle 20. Specifically, the engaging parts 51d has flat inner surfaces that radially face with the fiat surfaces of the chamfered sections 33, respectively. Thus, the left retaining member 51 is slidably and non-rotatably mounted to the chamfered sections 33 of the hub axle 20.

Furthermore, the engaging parts 51d have axial inward faces 51e (e.g., abutment faces), respectively, that axially contact with axial outward faces 33a of the chamfered sections 33, respectively. The axial movement of the left retaining member 51 relative to the hub axle 20 towards the right end of the hub axle 20 is restricted by the axial outward faces 33a of the chamfered sections 33. The left retaining member 51 does not axially contact with the left inner ring 42 while the engaging parts 51d of the left retaining member 51 contact with the chamfered sections 33, respectively. Since the left inner ring 42 is threadedly coupled to the hub axle 20, the axial position of the left inner ring 42 relative to the hub axle 20 is locked while the left inner ring 42 is non-rotatably coupled to the hub axle 20. Since the left retaining member 51 is non-rotatably engaged with the hub axle 20 and the left inner ring 42, the left inner ring 42 is also non-rotatably engaged with the hub axle 20, thereby the axial position of the left inner ring 42 relative to the hub axle 20 is locked. Specifically, the axial position of the left inner ring 42 relative to the hub axle 20 is locked by the left retaining member 51 even though the left inner ring 42 does not axially contact with the left retaining member 51.

The left lock member 53 has a generally tubular shape, and is for example, made of metallic material, such as aluminum alloy. The left lock member 53 is fixedly coupled to the hub axle 20. Specifically, the left lock member 53 has a right handed male or external screw section 53a (e.g., an external thread portion), a bicycle fork attachment section 53b and a flange section 53c with an axially facing surface 53d (e.g., a second attachment face and an axial contact face). The male screw section 53a, the bicycle fork attachment section 53b and the flange section 53c are concentrically arranged in an axial direction of the left lock member 53. The flange section 53c is axially arranged between the male screw section 53a and the bicycle fork attachment section 53b.

The male screw section 53a is threaded to the female screw section 31 of the hub axle 20. When the male screw section 53a is fully tightened to the hub axle 20, the axially facing surface 53d of the flange section 53c axially contacts with a left axial end face 65 (e.g., an axial end face) of the hub axle 20. In other words, the axially facing surface 53d of the flange section 53c forms an axial contact face that axially contacts with the left axial end face 65 of the hub axle 20. The bicycle fork attachment section 53b is configured to be coupled to the front fork 16 (see FIG. 2). Specifically, the bicycle fork attachment section 53b has an outer peripheral attachment face that contacts with an attachment bore of the front fork 16. The bicycle fork attachment section 53b is larger in diameter than the male screw section 53a. The flange section 53c is larger in diameter than the bicycle fork attachment section 53b. When the male screw section 53a is fully tightened to the hub axle 20, the axially facing surface 53d of the flange section 53c is axially spaced apart from an axially facing surface 51f (e.g., a first attachment face) of the left retaining member 51. In other words, the axially facing surface 53d of the flange section 53c axially faces with the axially facing surface 51f of the left retaining member 51 such that the axially facing surfaces 51f and 53d define an axial spacing 67 therebetween. Thus, the left lock member 53 does not axially and directly contact with the left retaining member 51 while the male screw section 53a is fully tightened to the hub axle 20 and the axially facing surface 53d of the flange section 53c axially contacts with the left axial end face 65 of the hub axle 20.

The left intermediate member 55 is basically a biasing member, such as a spring washer. In particular, in the illustrated embodiment, the left intermediate member 55 is a wave washer. However, the left intermediate member 55 can be different types of biasing members. The left intermediate member 55 is made of nonmetallic material, such as a rubber. The left intermediate member 55 can be made of any suitable material as desired or needed. In particular, the left intermediate member 55 can be made of metallic material. The left intermediate member 55 is disposed between the axially facing surface 51f of the left retaining member 51 and the axially facing surface 53d of the left lock member 53 within the axial spacing 67. The left intermediate member 55 has an axial overall thickness that is larger than the axial dimension of the axial spacing 67 defined between the axially facing surfaces 51f and 53d while the left intermediate member 55 is in an unloaded state. On the other hand, the left intermediate member 55 is compressed between the axially facing surfaces 51f and 53d while the left intermediate member 55 is disposed between the axially facing surfaces 51*f* and 53*d* and the left lock member 53 is fully tightened to the hub axle 20. The left intermediate member 55 axially biases the left retaining member 51 and the left lock member 53 away from each other while the left intermediate member 55 is in a loaded state. In particular, the left intermediate member 55 axially biases the left retaining member 51 in the inward axial direction such that the axial inward faces 51*e* of the engaging parts 51*d* of the left retaining member 51 is pressed against the axial outward faces 33*a* of the chamfered sections 33 of the hub axle 20. Thus, the axial position of the left retaining member 51 relative to the hub axle 20 is retained by the biasing force of the left intermediate member 55. Furthermore, the left intermediate member 55 axially biases the left lock member 53 in the outward axial direction. Thus, the thread connection between the left lock member 53 and the hub axle 20 is retained without loose by the biasing force of the left intermediate member 55.

Furthermore, as best shown in FIG. 7, the right retaining member 52 is non-rotatably and slidably engaged with the right inner ring 47 of the right bearing 22*b*. The axial position of the right inner ring 47 relative to the hub axle 20 is locked or retained by the right retaining member 52. The right lock member 54 is threadedly coupled to the male screw section 36 of the hub axle 20. The right intermediate member 56 is disposed between the right retaining member 52 and the right lock member 54 such that the right intermediate member 56 contacts with the right retaining member 52 and the right lock member 54.

Specifically, the right retaining member 52 is made of non-metallic material. In particular, the right retaining member 52 is made of a resin, such as a carbon fiber reinforced resin. Of course, the right retaining member 52 can be made of any other suitable materials such as a hard plastic resin or a metallic material. The right retaining member 52 is a one-piece, unitary member. The right retaining member 52 has first and second inner peripheral surfaces 52*a* and 52*b*. The second inner peripheral surface 52*b* is smaller in diameter than the first inner peripheral surface 52*a*. The right retaining member 52 also has a plurality of internal splines 52*c* on the first inner peripheral surface 52*a*. The internal splines 52*c* of the right retaining member 52 mesh with a plurality of external splines 47*b* of the right inner ring 47 of the right bearing 22*b*, thereby non-rotatably and slidably coupling the right retaining member 52 with the right inner ring 47 of the right bearing 22*b*. The second inner peripheral surface 52*b* is configured such that the male screw section 36 and the chamfered sections 37 of the hub axle 20 extend through a bore defined by the second inner peripheral surface 52*b* of the right retaining member 52. Specifically, the second inner peripheral surface 52*b* has a pair of flat parts 52*d* (only one of the flat parts 52*d* is shown in FIG. 7). As best shown in FIG. 8, the flat parts 52*d* radially face with the flat surfaces of the chamfered sections 37, respectively. Thus, the right retaining member 52 is slidably and non-rotatably mounted to the chamfered sections 37 of the hub axle 20.

Furthermore, the right retaining member 52 has an axial inward face 52.*e* that axially contacts with an axial end face 47*c* of the right inner ring 47 of the right bearing 22*b*. The axial movement of the right retaining member 52 relative to the hub axle 20 towards the left end of the hub axle 20 is restricted by the axial end face 47*c* of the right inner ring 47 of the right bearing 22*b*. Since the right inner ring 47 is threadedly coupled to the hub axle 20, the axial position of the right inner ring 47 relative to the hub axle 20 is locked while the right inner ring 47 is non-rotatably coupled to the hub axle 20. Since the right retaining member 52 is non-rotatably engaged with the hub axle 20 and the right inner ring 47, the right inner ring 47 is also non-rotatably engaged with the hub axle 20, thereby the axial position of the right inner ring 47 relative to the hub axle 20 is locked. In the illustrated embodiment, the right inner ring 47 and the right retaining member 52 axially contact with each other. However, the right inner ring 47 and the right retaining member 52 can be configured such that the axial end face 47*c* of the right inner ring 47 and axial inward face 52*e* of the right retaining member 52 do not axially contact with each other. Since the right retaining member 52 is non-rotatably engaged with the hub axle 20 and the right inner ring 47, the axial position of the right inner ring 47 relative to the hub axle 20 can be locked by the right retaining member 52 even though the right inner ring 47 does not axially contact with the right retaining member 52.

The right lock member 54 has a generally tubular shape, and is for example, made of metallic material, such as aluminum alloy. The right lock member 54 is fixedly coupled to the hub axle 20. Specifically, the right lock member 54 has a right handed female or internal screw section 54*a* (e.g., an internal thread portion), a bicycle fork attachment section 54*b* and a flange section 54*c* with an axially facing surface 54*d* (e.g., a second attachment face). In particular, the bicycle fork attachment section 54*b* and the flange section 54*c* are concentrically arranged in an axial direction of the right lock member 54. The female screw section 54*a* extends along an internal bore that extends between the bicycle fork attachment section 54*b* and the flange section 54*c*. The right lock member 54 further has an engaging part 54*e* that radially and inwardly extends from the internal bore of the bicycle fork attachment section 54*b*.

The female screw section 54*a* is threaded to the male screw section 36 of the hub axle 20. When the female screw section 54*a* is fully tightened to the hub axle 20, an axially facing annular surface 54*f* of the engaging part 54*e* axially contacts with a right axial end face 66 (e.g., an axial end face) of the hub axle 20. In other words, the annular surface 54*f* of the engaging part 54*e* forms an axial contact face that axially contacts with the right axial end face 66 of the hub axle 20. The bicycle fork attachment section 54*b* is configured to be coupled to the front fork 16 (see FIG. 2). Specifically, the bicycle fork attachment section 54*b* has an outer peripheral attachment face that contacts with an attachment bore of the front fork 16. The bicycle fork attachment section 54*b* is smaller in diameter than the flange section 54*c*. When the female screw section 54*a* is fully tightened to the hub axle 20, the axially facing surface 54*d* of the flange section 54*c* is axially spaced apart from an axially facing surface 52*f* (e.g., a first attachment face) of the right retaining member 52. In other words, the axially facing surface 54*d* of the flange section 54*c* axially faces with the axially facing surface 52*f* of the right retaining member 52 such that the axially facing surfaces 52*f* and 54*d* define an axial spacing 68 therebetween. Thus, the right lock member 54 does not axially and directly contact with the right retaining member 52 while the female screw section 54*a* is fully tightened to the hub axle 20 and the annular surface 54*f* of the flange section 54*c* axially contacts with the right axial end face 66 of the hub axle 20.

The right intermediate member 56 is basically a biasing member, such as a spring washer. In particular, in the illustrated embodiment, the right intermediate member 56 is a wave washer. However, the right intermediate member 56 can be different types of biasing members. The right intermediate member 56 is made of nonmetallic material, such as a rubber. The right intermediate member 56 can be made of any suitable material as desired or needed. In particular, the right intermediate member 56 can be made of metallic material.

The right intermediate member 56 is disposed between the axially facing surface 52f of the right retaining member 52 and the axially facing surface 54d of the right lock member 54 within the axial spacing 68. The right intermediate member 56 has an axial overall thickness that is larger than the axial dimension of the axial spacing 68 defined between the axially facing surfaces 52f and 54d while the right intermediate member 56 is in an unloaded state. On the other hand, the right intermediate member 56 is compressed between the axially facing surfaces 52f and 54d while the right intermediate member 56 is disposed between the axially facing surfaces 52f and 54d and the right lock member 54 is fully tightened to the hub axle 20. The right intermediate member 56 axially biases the right retaining member 52 and the right lock member 54 away from each other while the right intermediate member 56 is in a loaded state. In particular, the right intermediate member 56 axially biases the right retaining member 52 in the inward axial direction such that the axial inward faces 52e of the right retaining member 52 is pressed against the axial end face 47c of the right inner ring 47 that is threadedly coupled to the hub axle 20. Thus, the axial position of the right retaining member 52 relative to the hub axle 20 is retained by the biasing force of the right intermediate member 56. Furthermore, the right intermediate member 56 axially biases the right lock member 54 in the outward axial direction. Thus, the thread connection between the right lock member 54 and the hub axle 20 is retained without loose by the biasing force of the right intermediate member 56.

In the illustrated embodiment, left and right end structures of the front hub 12 are different from each other. Specifically, the left end structure of the front hub 12 that is formed by the left end structure 20a of the hub axle 20, the left bearing 22a, the left retaining member 51, the left lock member 53 and the left intermediate member 55 is different from the right end structure of the front hub 12 that is formed by the right end structure 20b of the hub axle 20, the right bearing 22b, the right retaining member 52, the right lock member 54 and the right intermediate member 56. Alternatively or additionally, the left end structure of the front hub 12 can be applied to the right end structure of the front hub 12. Furthermore, the right end structure of the front hub 12 can be applied to the left end structure of the front hub 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A bicycle hub assembly comprising:
   a hub axle;
   a hub shell rotatably supported relative to the hub axle;
   a bearing unit rotatably supporting the hub shell relative to the hub axle, the bearing unit having a first ring that is coupled to the hub axle, a second ring that is coupled to the hub shell, and a plurality of rollers that are disposed between the first and second rings;
   a retaining member coupled to the first ring of the bearing unit with a slidable coupling that allows an axial movement of the retaining member with respect to the first ring of the bearing unit while retaining an axial position of the first ring of the bearing unit with respect to the hub axle, the retaining member including a first attachment face and a first axial abutment face, the first axial abutment face engaging a second axial abutment face of the hub axle;
   a lock member fixedly coupled to the hub axle, the lock member including a second attachment face that faces the first attachment face of the retaining member; and
   an intermediate member disposed between the first attachment face of the retaining member and the second attachment face of the lock member, the intermediate member axially biasing the retaining member and the lock member away from each other.

2. The bicycle hub assembly according to claim 1, wherein the hub axle has a retaining member attachment section, and
   the retaining member is non-rotatably mounted to the retaining member attachment section of the hub axle.

3. The bicycle hub assembly according to claim 2, wherein the retaining member attachment section of the hub axle has an outer peripheral face with a recessed part,
   the retaining member further has an inner peripheral face with an engaging part, the engaging part of the retaining member non-rotatably engaging with the recessed part of the retaining member attachment section of the hub axle.

4. The bicycle hub assembly according to claim 2, wherein the retaining member attachment section of the hub axle includes the second abutment face that limits an axial movement of the retaining member in an axial direction of the hub axle away from the second attachment face of the lock member.

5. The bicycle hub assembly according to claim 1, wherein the intermediate member is a biasing member axially biasing the retaining member and the lock member away from each other.

6. The bicycle hub assembly according to claim 5, wherein the biasing member is a spring washer.

7. The bicycle hub assembly according to claim 6, wherein the spring washer is a wave washer.

8. The bicycle hub assembly according to claim 5, wherein the intermediate member is made of non-metallic material.

9. The bicycle hub assembly according to claim 8, wherein the non-metallic material is made of a rubber.

10. The bicycle hub assembly according to claim 1, wherein
    the retaining member is non-rotatably coupled relative to the first ring of the bearing unit.

11. The bicycle hub assembly according to claim 1, wherein
    the retaining member is made of non-metallic material.

12. The bicycle hub assembly according to claim 11, wherein
    the retaining member is made of a resin.

13. The bicycle hub assembly according to claim 12, wherein
    the retaining member is made of a carbon fiber reinforced resin.

14. The bicycle hub assembly according to claim 1, wherein
   the first ring of the bearing unit is threadedly coupled to a threaded section of the hub axle.

15. The bicycle hub assembly according to claim 1, wherein
   the lock member includes an axial contact face that axially contacts with an axial end face of the hub axle.

16. The bicycle hub assembly according to claim 1, wherein
   the lock member further includes a bicycle fork attachment section that is configured to be coupled to a bicycle fork of a bicycle.

17. The bicycle hub assembly according to claim 1, wherein
   the lock member includes an internal thread portion that is threaded to an external thread portion of the hub axle.

18. The bicycle hub assembly according to claim 1, wherein
   the lock member includes an external thread portion that is threaded to an internal thread portion of the hub axle.

* * * * *